April 3, 1962 L. O. CRABTREE 3,027,820
CAMERA FOCUSING MECHANISM
Filed May 5, 1958 3 Sheets-Sheet 1

INVENTOR
LLOYD O. CRABTREE

BY Strauch, Nolan + Neale
ATTORNEYS

April 3, 1962  L. O. CRABTREE  3,027,820
CAMERA FOCUSING MECHANISM
Filed May 5, 1958  3 Sheets-Sheet 2

INVENTOR
LLOYD O. CRABTREE
BY
ATTORNEYS

April 3, 1962 L. O. CRABTREE 3,027,820
CAMERA FOCUSING MECHANISM
Filed May 5, 1958 3 Sheets-Sheet 3
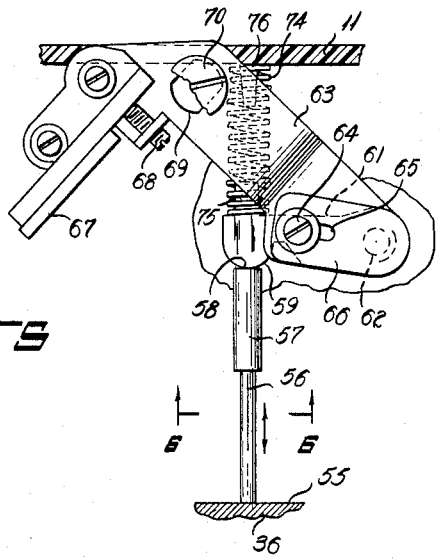
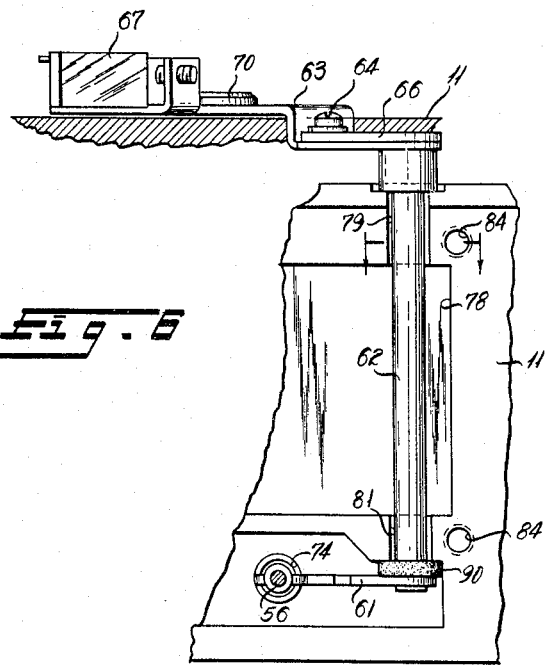
INVENTOR
LLOYD O. CRABTREE
BY
ATTORNEYS

United States Patent Office 3,027,820
Patented Apr. 3, 1962

3,027,820
CAMERA FOCUSING MECHANISM
Lloyd O. Crabtree, Ann Arbor, Mich., assignor, by mesne assignments, to Sylvania Electric Products Inc., Wilmington, Del., a corporation of Delaware
Filed May 5, 1958, Ser. No. 732,982
6 Claims. (Cl. 95—44)

This invention relates to camera focusing mechanism and particularly to mechanism for coupling the movable element of a focusing lens mount to a movable element of the range finder whereby adjustment of the range finder automatically focuses the lens for the distance measured by the range finder.

In its preferred embodiment the invention will be described as applied to a camera wherein the lens assembly contains an element that is rotatable for focusing and this element is connected by a reciprocable pin that passes through the interior of the lens mount into the camera body to operable connection with the shiftable element of the range finder on the camera.

It is the major object of the invention to provide in a camera having a lens mount on its front wall and a range finder on another wall a motion transmitting coupling mechanism that extends from an axially shiftable part of the lens assembly through the interior of the lens mount into the camera body and then across to operable connection with the movable element of the range finder.

A further object of the invention is to provide a novel motion transmitting coupling mechanism between an axially shiftable lens in a camera and a pivoted optical member in the range finder.

It is a further object of the invention to provide a novel motion transmitting coupling between an axially shiftable lens and a movable range finder element in a camera wherein a reciprocable pin is operably connected to control rotation of a shaft having operable connection to said element.

A further object of the invention is to provide a novel camera focusing mechanism wherein a novel motion transmitting coupling is provided between the lens mount and the shiftable optical element of a range finder wherein axial displacement of the lens for focusing reciprocates a pin that engages a lever on one end of a rotatable shaft to cause pivotal adjustment of a range finder optical element mounted on the other end of the shaft.

It is a further object of the invention to provide a novel camera construction wherein a rockable shaft in the motion transmitting mechanism between a camera lens and a range finder is mounted in a special bearing arrangement on the camera.

A further object of the invention is to provide a novel shaft mounting wherein the shaft rests in an inclined wall socket against which it is laterally resiliently biased.

Further objects of the invention will appear as the description proceeds in connection with the appended claims and the appended drawings wherein:

FIGURE 5 is a fragmentary top view partly in section showing the range finder element control;

FIGURE 6 is a fragmentary side elevation partly in section showing the control of FIGURE 3; and FIGURE 7 is a fragmentary section on line 7—7 of FIGURE 6 showing shaft mounting details.

Figure 1:
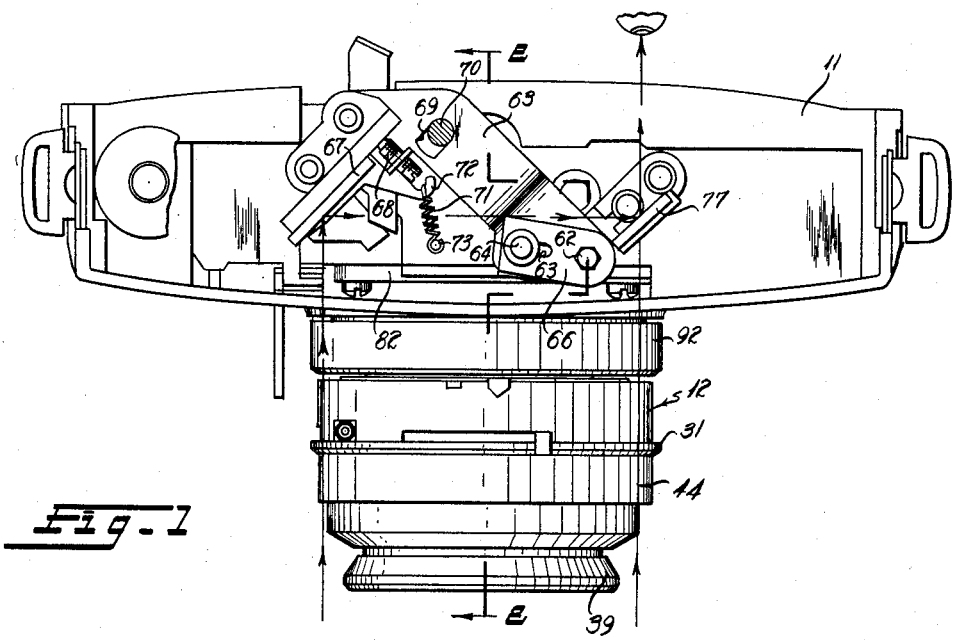
FIGURE 1 is a top plan view of a camera incorporating a preferred embodiment of the invention, the top cover being removed to show range finder details.

The camera comprises a suitable rigid body 11 having a forwardly disposed lens mount assembly 12. A nosepiece 13 projects rigidly from the front of the camera and it has an internal annular flange 14 against which abuts the end flange 15 of a tubular mounting collar 16 that is internally threaded at 17 for engaging coacting threads 18 on the tubular support member 19. When collar 16 is drawn tight the entire lens mount assembly 12 is fixed upon the front wall of the camera and support 19 effectively becomes a rigid projection from the camera body.

The rear lens 21 is fixed in a cell 22 that is threadedly mounted and crimped on member 19 at 23 so as to be fixed against both axial and rotational displacement with respect to member 19. Similarly the center lens 24 is mounted in a cell 25 that is threadedly mounted at 26 on an internal member 27 rigid with support 19 and is likewise fixed against both axial and rotational displacement with respect to member 19. An axial flange 20 projects forwardly from the periphery of support 19.

The shutter assembly is indicated at 28 and in addition to supports 19 and 27 it includes a fixed plate 29 on which shutter mechanism (not shown) is mounted and a rotatable shutter opening setting ring 31 is available to the operator outside the lens mount.

Center lens cell 25 has a front flange 32 which is externally threaded at 33 for rotatably mounting the front lens cell and focusing assembly. This latter comprises a front cell 34 in which front lens 35 is fixed, an annular focusing nut 36 having internal threads 37 coacting with center cell threads 33 and to which the front cell 34 is fixed as by means indicated at 38, and a focusing scale member 39 which is fixed to nut 36 as by a set screw 40 extending through axial flange 41 and entering an annular groove 42 in the lens cell.

Thus when the operator turns member 39 by grasping knurled rim 43 the nut 36 is rotated on its screw thread mount at 33, 37 and due to the lead of the screw threads nut 36 shifts parallel to the optical axis of the lenses. Since front cell 34 is fixed to nut 36 the lens 35 is thereby shifted along its axis to vary the focus of the lens assembly.

Rigid with fixed plate 29 of the shutter assembly is an annular collar 44 that extends over flange 41 and mounts a radially projecting stop pin 45. The inner end of flange 41 is cut away to provide stop faces 46 and 47 that coact with fixed stop pin 43 to define the focus adjustment limits.

Figure 3:
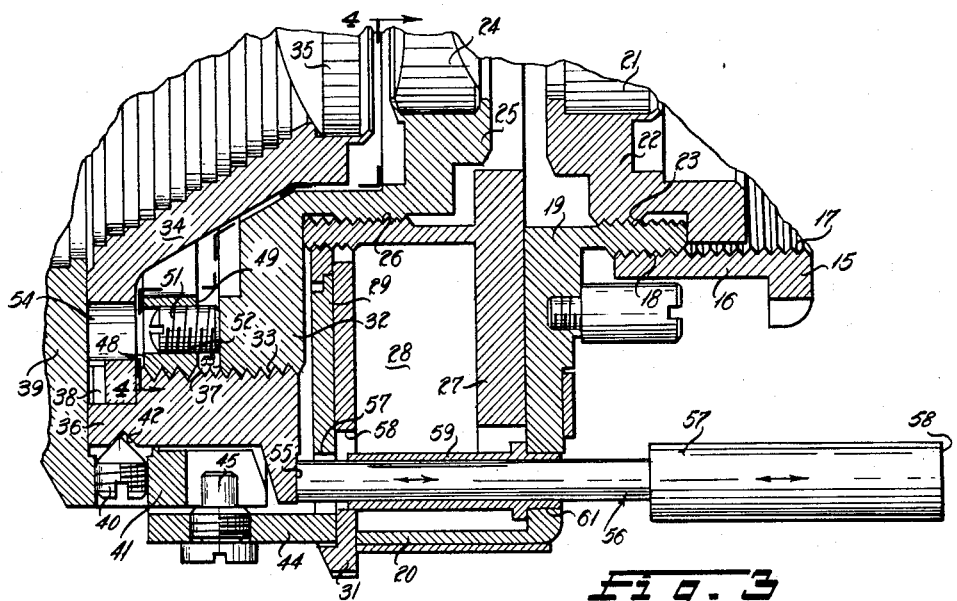
FIGURE 3 is an enlarged fragmentary section showing the reciprocable connection between the lens mount and the range finder control linkage.
Figure 4:
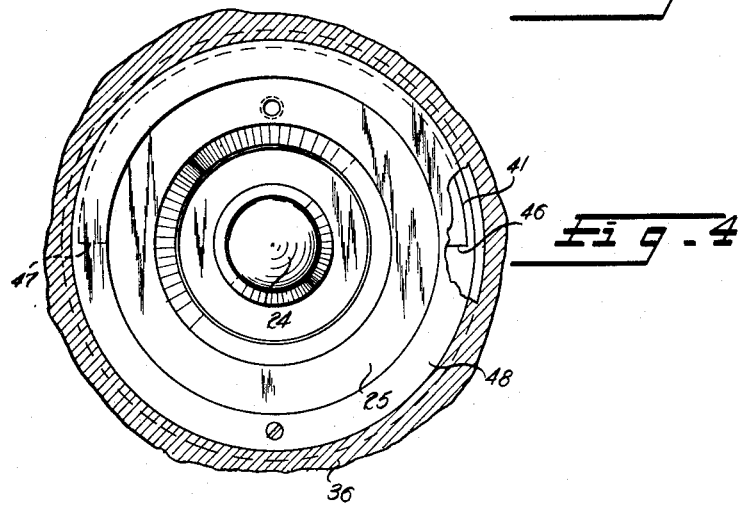
FIGURE 4 is a front elevation of the lens mount partially broken away and in section along line 4—4 of FIGURE 3 showing the focusing stop.
Figure 1:
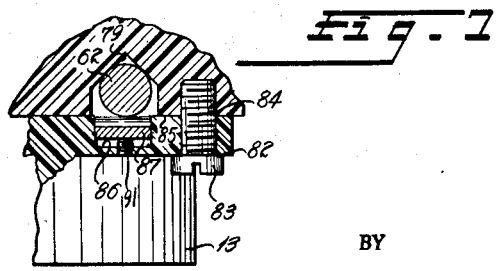

The threads 33 of center cell 25 are shown as extending over the axial flange 48 of the center cell. In the illustrated embodiment a slot 49 is provided in flange 48 which extends about 180° around the flange to axially weaken the flange, and a set screw 51 is threaded at 52 in the end section of the flange and adapted to bear on face 53 of the cell 25. Rotation of set screw 51 axially adjusts the threaded flange 48 for the purpose of insuring full surface thread engagement at 33, 37 and thereby eliminating backlash in the focusing operation. When set screw 51 is rotated in one direction, and with nut 36 mounted on flange 48, the front threaded flange section in which set screw 51 is mounted will be displaced to the left in FIGURE 3 to take up axial play in the threads at 33, 37. Access to set screw 51 is had through aperture 54 of the front cell 34.

The parts 19 and 29 of the lens mount assembly are therefore rigid with the camera body, and the nut 36 is rotatable about and reciprocable on the optical axis with respect to the camera body. A flat annular face 55 is formed on nut 36 perpendicular to the optical axis, and face 55 slidably abuts the flat end of a focusing pin 56 that extends freely through suitable clearance apertures in the shutter assembly at 57 and 58 into a supporting elongated bushing 59 that has one end fixed at 61 to stationary lens mount member 19.

The inner end of pin 56 is enlarged at 57 and terminates in a flat face 58 that abuts the rounded nose 59 of a range lever 61 secured upon the end of ranging shaft 62 that extends at right angles to the direction of reciprocation of pin 56 and projects up into the range finder area on the top wall of the camera.

A bracket arm 63 has one end pivoted on shaft 62 and is connected by a screw 64 and slot 65 with a bracket arm 66 fixed to shaft 62. By loosening screw 64 the angular relationship of bracket arms 63 and 66 can be adjusted but when screw 64 is tight the bracket arm 63 is fixed to the end of shaft 62.

Bracket arm 63 carries a plane reflector 67 the angularity of which an arm 63 can be adjusted by set screw 68. Bracket arm 63 has an elongated aperture 69 through which extends a pin 70 rigid with the camera top wall for limiting the angular travel of bracket arm 63. A compression spring 74 coaxial with pin 56 extends between a boss 75 on lever 61 and a fixed projection 76 on the back wall of body 11 to normally bias the entire assembly of shaft 62, lever 61 and bracket 63 counterclockwise in FIGURE 1. This spring bias on the assembly thus also keeps the focusing pin ends tight with nut face 55 and arm surface 59.

On the top wall of the camera body as shown in FIGURE 1, reflector 67 is laterally aligned with the fixed half-silvered mirror 77 which is aligned with the eye of the observer, the light path being indicated by the arrows. This is essentially a known type of range finder wherein the image reflected from reflectors 67 and 77 is combined with the image passing through reflector 77 in the observer's line of sight and the reflector 67 is adjusted to obtain coincidence of the images.

It will be seen that as the member 39 is rotated to focus the lens assembly the reflector 67 will be automatically adjusted about the pivot axis of shaft 62 because axial shift of nut 36 causes corresponding axial shift of pin 56 to rock lever 61, shaft 62 and bracket arm 63.

Figure 2:
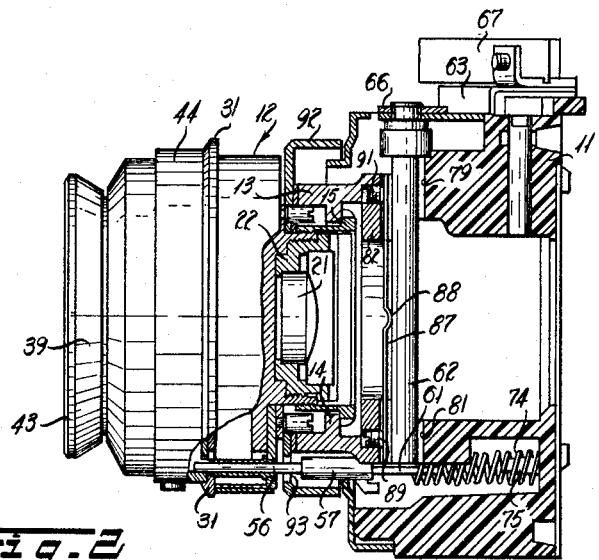
FIGURE 2 is a section on line 2—2 of FIGURE 1.

My invention includes a special resilient bearing support for shaft 62 in the camera body that is best shown in FIGURES 2, 6 and 7. The body is open at 78 as shown in FIGURE 6, and over this opening is mounted nosepiece 13. Above and below opening 78 the front wall is formed with forwardly open parallel identical V-grooves 79 and 81. Groove 79 is shown in FIGURE 7 as seating cylindrical shaft 62 with two line bearing contact at opposite sides of the groove.

Shaft 62 is maintained in the grooves by the nosepiece 13 which as shown in FIGURE 7 has a rectangular flange 82 through which holding screws 83 pass into suitable threaded holes 84 in the body. One of these screws is at each corner of the flange 82. The body surface at 85 is flat and substantially tangent to the surface of shaft 62 in the grooves. The inner side of flange 82 is formed with a straight groove 86 in which is seated a leaf spring beam 87 that extends parallel to shaft 62. As shown in FIGURE 2 leaf spring 87 has an integral central projection 88 bearing at about the longitudinal center of shaft 62, and its opposite ends bear against set screws 89 and 91 projecting into the bottom of groove 86. Thus when the nosepiece 13 is fixed on the front wall of the camera by tightening screws 83 the shaft 62 is laterally urged against its V-groove socket structure by the resilient pressure of spring 87 applied at the middle of the shaft. This arrangement mounts shaft 62 truly with minimum friction, and by adjusting the set screws at 89, 91 the slight lateral resilient pressure on the shaft may be varied to suit the adjustment requirements. The flat sides of grooves 79 and 81 which may be accurately made locate shaft 62 accurately. A light seal washer 90 is usually provided at the lower end of shaft 62.

Where pin 56 leaves the lens mount and enters the camera body it is covered by the cup-shaped annular shield 92 that is suitably fixed to camera body 11, an aperture 93 being provided for the purpose of passing through the shield. Thus it will be observed that the reciprocable pin 56 is essentially entirely housed by the camera parts. It extends through the lens mount into the camera body and is not exposed at the outside of the camera.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera, a body having a front opening, a lens assembly mounting member removably mounted over said opening, a lens assembly mounted on said member and having an optical axis extending through said opening, forwardly open socket means in the body near said opening, a rotatable shaft mounted in said socket means, the axis of said shaft lying in a plane parallel to a vertical plane through said optical axis, retainer means rigid with said mounting member extending over said socket means to hold the shaft in the socket means, resilient means interposed between said retainer means and the shaft, and means operably connecting opposite ends of said shaft to a shiftable lens element and a movable range finder element on the camera respectively.

2. In the camera defined in claim 1, said resilient means comprising a leaf spring parallel to the shaft.

3. In the camera defined in claim 2, said leaf spring having an intermediate portion bearing on said shaft and opposite ends bearing on said retainer means.

4. In the camera defined in claim 3, means for adjusting opposite ends of said leaf spring.

5. In a camera having a body, a lens assembly mounted on said body and comprising lens means mounted for focusing movement, a rockably mounted shaft, a lever on said shaft, a reciprocably mounted member slidable through the interior of said lens assembly operably connected between said lever and the lens means so that said focusing movement rocks said shaft, a radially extending arm secured to said shaft, means for adjusting said arm about the axis of said shaft to vary the relative angularity of said arm and said lever relative to said shaft axis, a light deflecting range finder member mounted directly on said arm in laterally displaced relation with respect to the axis of rocking of said shaft so that rocking of said shaft results in operative displacement of said range finder member, means limiting angular displacement of said shaft, and resilient means within said body biasing said lever into contact with the adjacent end of said reciprocably mounted member.

6. In a camera, a lens mount having a lens cell mounted for rotation and axial displacement for focusing, a range finder assembly having a movable reflector, a rotatably mounted shaft disposed parallel to a vertical plane through the optical axis of said lens mount, a bracket on one end of said shaft comprising a first bracket arm pivoted on said shaft and directly mounting said reflector, a second bracket arm rigid with said shaft and means adjustably connecting said arms for locating said first arm in desired angular relation on said shaft, a radial lever on the other end of said shaft, a rigid pin slidably mounted within said lens mount and having its opposite ends in bearing engagement with said lever and said lens cell, and means resiliently biasing said lever toward said pin.

References Cited in the file of this patent

UNITED STATES PATENTS

| | | |
|---|---|---|
| 2,242,452 | Cazin | May 20, 1941 |
| 2,261,421 | Steiner | Nov. 4, 1941 |
| 2,273,355 | Hineline | Feb. 17, 1942 |
| 2,305,437 | Meyers et al. | Dec. 15, 1942 |
| 2,467,456 | Baer | Apr. 19, 1949 |
| 2,641,157 | Schwartz et al. | June 9, 1953 |
| 2,693,744 | Smith et al. | Nov. 9, 1954 |
| 2,737,844 | Jerome et al. | Mar. 13, 1956 |

FOREIGN PATENTS

| | | |
|---|---|---|
| 676,075 | Great Britain | July 23, 1952 |